United States Patent
Levy et al.

[15] 3,678,048
[45] July 18, 1972

[54] PREPARATION OF TERTIARY AMINOALKYL DERIVATIVES OF SUBSTITUTED ACETOHYDROXAMIC ACID ESTERS

[72] Inventors: Joseph Levy, Paramus, N.J.; James Psihas, New York, N.Y.

[73] Assignee: Universal Oil Products Company, Des Plaines, Ill.

[22] Filed: March 23, 1970

[21] Appl. No.: 21,998

[52] U.S. Cl..............260/247.2 B, 260/247.5, 260/293.65, 260/293.76, 260/293.78, 260/326.3, 260/326.5 L, 260/453, 424/248
[51] Int. Cl. .......................................................C07d 87/42
[58] Field of Search...................260/453 R, 247.2 B, 294 R, 260/294 A, 247.5 R, 326.5 L, 326.3

[56] References Cited

UNITED STATES PATENTS 3,268,539   8/1966   Levy......................................260/294
3,488,355   1/1970   Levy......................................260/294

Primary Examiner—Alex Mazel
Assistant Examiner—Jose Tovar
Attorney—James R. Hoatson and Raymond H. Nelson

[57] ABSTRACT

Tertiary aminoalkyl derivatives of substituted acetohydroxamic acid esters are prepared by reacting an alkyl ester of a substituted acetohydroxamic acid with an acid salt of a tertiary aminoalkyl halide in a dipolar aprotic solvent medium in the presence of an acid acceptor compound.

12 Claims, No Drawings

PREPARATION OF TERTIARY AMINOALKYL DERIVATIVES OF SUBSTITUTED ACETOHYDROXAMIC ACID ESTERS

This invention relates to a novel method for the preparation of tertiary aminoalkyl derivatives of substituted acetohydroxamic acid esters. More particularly, the invention is concerned with a method for preparing the aforesaid compounds in a manner more convenient and less hazardous than was heretofore employed.

It has now been discovered that tertiary aminoalkyl derivatives of substituted acetohydroxamic acid esters, which compounds find a particular use in the medical field, especially as anti-spasmodic and anti-cholinergic drugs, may be prepared by a highly improved process. Heretofore, the prior method of preparing these compounds, which comprised the preparation of an alkali metal derivative of the acetohydroxamic acid ester followed by reaction with the highly unstable and toxic tertiary aminoalkyl halide, involved many operating difficulties. Due to the instability of the aminoalkyl halide free bases, it was necessary to prepare solutions of these compounds in an inert solvent by treatment of the available hydrochloride salts with caustic alkali at low temperatures of about 0° C. This, of necessity, involved the use of equipment which was relatively more complicated (for example, the use of refrigeration apparatus) than is ordinarily required to operate the process of the present invention. In addition, due to the high toxicity of the tertiary aminoalkyl halides, special care had to be taken during the operation of the process. Furthermore, isolation and purification of the products of the reaction was relatively tedious and difficult. However, in contradistinction to the aforementioned unsatisfactory method of preparation, we have now discovered that the desired products may be prepared by a highly improved process for the alkylation of the particular hydroxamic acid ester thereof utilizing more stable starting materials, and permitting ready isolation of the products in a pure state.

It is therefore an object of this invention to provide an improved process for the preparation of tertiary amino-alkyl derivatives of substituted acetohydroxamic acid esters.

A further object of this invention is to provide a relatively safe and efficient method of preparing the desired compounds without the attendant use of more complicated equipment and safety precautions.

In one aspect an embodiment of this invention resides in a process for the preparation of a tertiary aminoalkyl derivative of a substituted acetohydroxamic acid ester which comprises reacting a lower alkyl ester of a substituted acetohydroxamic acid with an acid salt of a tertiary aminoalkyl halide in a dipolar aprotic solvent medium in the presence of an acid acceptor at reaction conditions, and recovering the resultant tertiary aminoalkyl derivative of a substituted acetohydroxamic acid ester.

A specific embodiment of this invention is found in the process for the preparation of a tertiary aminoalkyl derivative of a substituted acetohydroxamic acid ester which comprises reacting methyl α-hydroxydiphenylacetohydroxamate with 2-chloro-N,N-diethylethylamine hydrochloride in a dimethyl formamide solvent medium in the presence of potassium carbonate at a temperature in the range of from about ambient to about 100°C., and recovering the resultant 2-diethylaminoethyl derivative of methyl α-hydroxydiphenylacetohydroxamate.

Other objects and embodiments will be found in the following further detailed description of the present invention.

As hereinbefore set forth the present invention is concerned with a novel and improved process for preparing tertiary aminoalkyl derivatives of substituted acetohydroxamic acid esters in a manner hereinafter set forth in greater detail. The term "substituted acetohydroxamic acid ester" as used in the present specification and appended claims will refer to those acid esters which contain two cycloalkyl or aryl substituents on the α-carbon atom of the acetohydroxamic acid portion of the compound. Examples of alkyl esters of substituted acetohydroxamic acids and particularly lower alkyl esters will possess the generic formula:

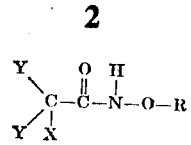

in which X is selected from the group consisting of hydrogen and hydroxyl radicals, R is selected from the group consisting of alkyl radicals containing from one to about five carbon atoms and Y is independently selected from the group consisting of cycloalkyl and aryl radicals. Specific examples of these compounds will include methyl diphenylacetohydroxamate, ethyl diphenylacetohydroxamate, propyl diphenylacetohydroxamate, butyl diphenylacetohydroxamate, amyl diphenylacetohydroxamate, methyl di-(o-tolyl)acetohydroxamate, ethyl di-(m-tolyl)acetohydroxamate, propyl di(p-tolyl)acetohydroxamate, methyl p-methoxydiphenylacetohydroxamate, ethyl p-chlorodiphenylacetohydroxamate, n-butyl p-methyldiphenylacetohydroxamate, methyl di-(o-methoxyphenyl)acetohydroxamate, ethyl di-(m-methoxyphenyl)acetohydroxamate, propyl di-(p-methoxyphenyl)acetohydroxamate, methyl di-(p-chlorophenyl)-acetohydroxamate, ethyl α-hydroxydiphenylacetohydroxamate, propyl α-hydroxy-di-(p-tolyl)acetohydroxamate, methyl α-hydroxy-p-chlorodiphenylacetohydroxamate, ethyl α-hydroxy-p-methoxydiphenylacetohydroxamate, methyl α-hydroxy-p-methyldiphenylacetohydroxamate, propyl α-hydroxy-p-methyldiphenylacetohydroxamate, etc., methyl dicyclopentylacetohydroxamate, methyl dicyclohexylacetohydroxamate, methyl cyclopentylphenylacetohydroxamate, methyl cyclohexylphenylacetohydroxamate, methyl cyclohexyl-p-chlorophenylacetohydroxamate, ethyl dicyclohexylacetohydroxamate, ethyl cyclopentylphenylacetohydroxamate, ethyl cyclohexyl-p-methoxyphenylacetohydroxamate, ethyl cyclopentyl-p-tolylacetohydroxamate, propyl dicyclohexylacetohydroxamate, methyl α-hydroxydicyclohexylacetohydroxamate, methyl α-hydroxydicyclopentylacetohydroxamate, methyl α-hydroxycyclohexylphenylacetohydroxamate, ethyl α-hydroxydicyclohexylacetohydroxamate, etc. It is to be understood that the aforementioned lower alkyl esters of substituted acetohydroxamic acids are only represenative of the class of compounds which may be used in the present process, and that this invention is not necessarily limited thereto.

The aforementioned alkyl esters of substituted acetohydroxamic acids are reacted with acid salts of tertiary amino-alkyl halides possessing the generic formula:

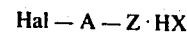

in which A is selected from the group consisting of straight and branch chain alkylene groups of from two to five carbon atoms, Z is a basic nitrogen containing radical selected from the group consisting of di-(lower alkyl)amino, the alkyl portion of the di-(lower alkyl)amino radicals containing from one to about five carbon atoms and cyclic amino groups selected from the group consisting of piperidino, pyrrolidino, and morpholino radicals, Hal is a halogen having an atomic weight of from 35 to 80 (i.e. chlorine or bromine, and preferably chlorine since the chlorine containing compounds are more readily available) and HX is an acid, preferably a halogen acid, in a manner hereinafter set forth in greater detail. Some specific examples of these acid salts of the tertiary aminoalkyl halides which may be reacted with the aforementioned esters will include 2-chloro-N,N-dimethylethylamine hydrochloride, 2-bromo-N,N-dimethylethylamine hydrochloride, 2-chloro-N,N-diethylethylamine hydrochloride, 2-bromo-N,N-diethylethylamine hydrochloride, 2-chloro-N,N-dipropylethylamine hydrochloride, 2-chloro-N,N-dibutylethylamine hydrochloride, 3-chloro-N,N-dimethylpropylamine hydrochloride, 3-chloro-N,N-diethylpropylamine hydrochloride, 3-chloro-N,N-dipropylpropylamine hydrochloride, 3-chloro-N,N-dibutylpropylamine hydrochloride, 2-chloro-N,N-dimethylisopropylamine hydrochloride, 2-chloro-N,N-diethylisopropylamine hydrochloride, 1-chloro-2-piperidinoethane hydrochloride, 1-chloro-2-pyrrolidinoethane hydrochloride, 1-chloro-2-morpholinoethane hydrochloride, 1-chloro-3-piperidinopropane hydrochloride, 1-chloro-3-pyrrolidinopropane hydrochloride, 1-chloro-3-morpholinopropane hydrochloride, 2-chloro-N,N-dimethylethylamine hydrobromide, 2-chloro-N,N-diethylethylamine hydrobromide, 2-chloro-N,N-dipropylethylamine hydrobromide, 3-chloro-N,N-dimethylpropylamine hydrobromide, 3-chloro-N,N-dipropylpropylamine hydrobromide, 2-chloro-N,N-dimethylisopropylamine hydrobromide, 1-chloro-2-piperidinoethane hydrobromide, 1-chloro-2-pyrrolidinoethane hydrobromide, 1-chloro-3-piperidinopropane hydrobromide, 1-chloro-3-morpholinopropane hydrobromide, etc. As in the case of the lower alkyl esters of the substituted acetohydroxamic acid, it is to be understood that the aforementioned acid salts of the tertiary aminoalkyl halides are only representative of the class of compounds which may be used and that the present process is not necessarily limited thereto.

The tertiary aminoalkyl derivatives of substituted acetohydroxamic acid esters which form the subject of this invention comprise the isomeric products formed by alkylation of either the nitrogen or carbonyl oxygen atoms, respectively, of the substituted acetohydroxamic acid ester as indicated in the following equation.

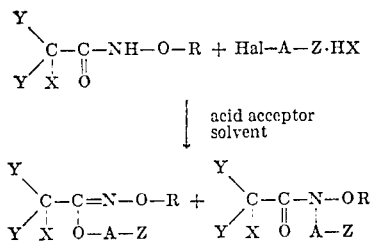

Both products are formed from any particular hydroxamate ester in the process of this invention and may be isolated and separated in pure state by conventional means taking advantage of differences in physical properties such as solubility, etc. Generally speaking, the oxygen alkylated derivative having the hydroximate structure indicated above will be produced in greater amount and will be found to be more readily crystallized than the nitrogen alkylated isomer.

The process of this invention is effected by reacting an alkyl ester of a substituted acetohydroxamic acid with the acid salt of a tertiary aminoalkyl halide at temperatures ranging from ambient (about 25°C. up to about 100°C.) and at atmospheric pressure, said reaction being effected in a dipolar aprotic solvent medium in the presence of an acid acceptor compound. Any suitable acid acceptor which will neutralize the acid generated in the reaction may be utilized. Some specific examples of dipolar aprotic solvents in which the reaction of the present invention is effected will include dimethyl formamide, dimethyl acetamide, N-methyl pyrrolidone, dimethyl sulfoxide, hexamethyl phosphoramide, tetramethylene sulfone, etc.; while some specific examples of acid acceptor compounds will include potassium carbonate, sodium carbonate, lithium carbonate, the preferred dipolar aprotic solvent being dimethyl formamide (DMF) and the preferred acid acceptor compound being potassium carbonate. The acid acceptor should be utilized in at least a sufficient amount to neutralize the acid introduced with the amino-alkyl halide salt as well as the acids produced in the reaction.

The process of this invention may be effected in any suitable manner and may comprise either a batch or continuous type operation, but is most conveniently conducted in a batch type operation. For example, when a batch type operation is used, the alkyl ester of the substituted acetohydroxamic acid, the dipolar aprotic solvent and the acid acceptor compound may be placed in the reaction vessel and the acid salt of the tertiary aminoalkyl halide is gradually added thereto. Inasmuch as the reaction is slightly exothermic in nature, some care must be taken during the addition of the acid salt to maintain the temperature within a suitable operating range, however, this is not critical to the success of the reaction. Upon completion of the addition, the temperature of the reaction mixture is raised to a predetermined level and maintained thereat for a residence time which may range from about 1 to about 10 hours or more in duration. A reaction temperature of about 100°C. is usually sufficient but, if desired, the temperature may be raised to about 150°C. or to the reflux point of the mixture. Upon completion of the residence time the dipolar aprotic solvent is recovered for reuse by distillation and the resultant slurry containing the reaction products plus inorganic salts is then treated by the addition of water and a water immiscible solvent. Any inert solvent having a suitable solubility for the products of the reaction may be employed, a preferred solvent being methyl isobutyl carbinol. The resultant mixture is then heated to effect solution of the inorganic salts and the organic layer is separated from the aqueous layer, cooled, and the resultant crystalline product is filtered and treated by conventional means of purification. Alternately, the product may be isolated as an acid addition salt by treating the organic layer with any suitable organic or inorganic acid such as hydrochloric acid, oxalic acid, etc. The isomeric product of the reaction may then be isolated from the filtrate by similar conventional means.

Tertiary aminoalkyl derivatives of lower alkyl esters of substituted acetohydroxamic acids which may be prepared according to the process of this invention hereinbefore set forth in detail will possess a formula selected from the group consisting of

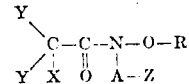

and

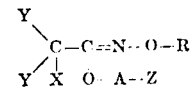

in which Y is independently selected from the group consisting of aryl and $C_5$ or $C_6$ cycloalkyl radicals, X is selected from the group consisting of hydrogen and hydroxyl radicals, R is selected from alkyl radicals containing from one to about five carbon atoms, A is selected from the group consisting of straight and branched chain alkylene groups of from two to five carbon atoms, and Z is a basic nitrogen containing radical selected from the group consisting of di-(lower alkyl)amino, and cyclic amino groups selected from the group consisting of piperidino, pyrrolidino, and morpholino radicals. Some examples of these compounds will include the 2-diethylaminoethyl derivatives of methyl diphenylacetohydroxamate, the methobromide quaternary salts of the 2-diethylaminoethyl derivatives of methyl diphenylacetohydroxamate, the 2-diethylaminoethyl derivatives of ethyl diphenylacetohydroxamate, the 2-diethylaminoethyl derivatives of propyl diphenylacetohydroxamate, the hydrochloric acid salts of the 2-diethylaminoethyl derivatives of propyl diphenylacetohydroxamate, the 2-diethylaminoethyl derivatives of methyl α-hydroxydiphenylacetohydroxamate, the methobromide quaternary salts of the 2-diethylaminoethyl derivatives of methyl α-hydroxydiphenylacetohydroxamate, the 3-dimethylaminopropyl derivatives of methyl diphenylacetohydroxamate, the 3-dimethylaminopropyl of ethyl diphenylacetohydroxamate, the 3-dimethylaminopropyl derivatives of methyl α-hydroxydiphenylacetohydroxamate, the 2-dimethylaminopropyl derivatives of methyl diphenylacetohydroxamate, the 2- dimethylaminopropyl derivatives of methyl α-hydroxydiphenylacetohydroxamate, the 2-piperidinoethyl derivatives of methyl diphenylacetohydroxamate, the 2-piperidinoethyl derivatives of methyl α-hydroxydiphenylacetohydroxamate, the 2-pyrrolidinoethyl derivatives of methyl diphenylacetohydroxamate, the 2-pyrrolidinoethyl derivatives of methyl α-hydroxydiphenylacetohydroxamate, the 3-pyrrolidinopropyl derivatives of methyl diphenylacetohydroxamate, the 3-pyrrolidinopropyl derivatives of methyl α-hydroxydiphenylacetohydroxamate, the 2-dimethylaminoethyl derivatives of methyl dicyclopentylacetohydroxamate, the 2-diethylaminoethyl derivatives of methyl dicyclohexylacetohydroxamate, the 2-diethylaminoethyl derivatives of methyl cyclopentylphenylacetohydroxamate, the 2-diethylaminoethyl derivatives of methyl cyclohexylphenylacetohydroxamate, the methobromide quaternary salts of the 2-diethylaminoethyl derivatives of methyl dicyclohexylacetohydroxamate, the 2-diethylaminoethyl derivatives of ethyl dicyclohexylacetohydroxamate, the 2-diethylaminoethyl derivatives of propyl dicyclohexylacetohydroxamate, the 2-diethylaminoethyl derivatives of methyl α-hydroxydicyclohexylacetohydroxamate, the 2-diethylaminoethyl derivatives of methyl α-hydroxycyclopentylphenylacetohydroxamate, the 3-dimethylaminopropyl derivatives of methyl dicyclohexylacetohydroxamate, the 2-piperidinoethyl derivatives of methyl cyclopentylphenylacetohydroxamate, the 2-pyrrolidinoethyl derivatives of methyl cyclopentylphenylacetohydroxamate, etc. As is evident from the above list of compounds, the term "tertiary aminoalkyl derivatives of esters of substituted acetohydroxamic acid esters" as used in the present specification and appended claims will also refer to the acid addition salts and quaternary salts of these compounds and that the aforementioned compounds are only representative of the class of compounds which may be prepared, the process of this invention not necessarily being limited thereto.

The following examples are given to illustrate the process of the present invention which, however, are not intended to limit the generally broad scope of the present invention in strict accordance therewith.

EXAMPLE I

Thirty-five hundred grams of a dipolar aprotic solvent comprising dimethyl formamide, 700 g. (2.72 moles) of methyl α-hydroxydiphenylacetohydroxamate and 876 g. (6.35 moles) of anhydrous potassium carbonate powder were charged to a 12 liter round bottom flask. To this mixture was then added portionwise 560 g. (3.76 moles) of 2-(diethylamino)ethyl chloride hydrochloride[2-chloro-N,N-diethylethylamine hydrochloride] during a period of about 0.5 hours at a temperature of about 25°–35°C. The reaction was mildly exothermic during the addition period. Upon completion of the addition of the hydrochloride, the temperature was raised during a period of about 0.5 hours to a range of from about 95° to 100°C. and maintained in this range for an additional period of about 1.5 hours. At the end of this time approximately 80% of the dimethyl formamide solvent was removed by fractional distillation under reduced pressure of about 50 mm. The residual slurry was then treated with 2,300 g. of water and 1,750 g. of methyl isobutylcarbinol, and the mixture was heated to a temperature of from about 65° to 75°C., with the resultant separation into a top organic layer and a lower aqueous layer. The layers were separated and the top organic layer was treated with decolorizing charcoal, filtered, and cooled to a temperature of about 5°C. whereupon crystallization occurred. The crystalline product which separated out was collected by filtration, washed twice with 200 g. of cooled isopropyl alcohol and dried. The crystalline product had a melting point of 113°–115°C. This free base was converted to its hydrochloride by treatment in acetone solution with hydrochloric acid. It melted at 182°–3°C.

The aforementioned product comprised the O-alkylated 2-diethylaminoethyl derivative of methyl α-hydroxydiphenylacetohydroxamate having the hydroximate structure heretofore described. In addition, the filtrate which remained after the last crystallization step was concentrated under vacuum and the more soluble N-substituted isomer contained therein, which was also produced during the reaction, was isolated as the crystalline hydrochloride salt by treatment with anhydrous hydrogen chloride. It melted at 161°–3°C. The free base was a viscous oil which could not be crystallized. Quaternary salts of these products may be readily prepared by conventional means such as treating alcohol solutions of the free bases with methyl bromide, methyl iodide, etc.

EXAMPLE II

In this example 2.5 moles of methyl diphenylacetohydroxamate, 6 moles of anhydrous potassium carbonate and 3,500 g. of dimethyl formamide are charged into a reaction vessel. To this mixture is added 3.7 moles of 2-chloro-N,N-diethylethylamine hydrochloride during a period of about 0.5 hours while maintaining the temperature at about 25° to 35°C. At the end of this time heat is applied to the reaction mixture until a temperature of about 100°C. is reached, this temperature being maintained for an additional period of 1.5 hours. At the end of this time a major portion of the solvent which is dimethyl formamide is removed by distillation under reduced pressure. The remaining slurry is then treated with water and methyl isobutylcarbinol at a temperature of about 75°C. The mixture, after separating into an organic layer and an aqueous layer, is separated and the organic layer is treated by conventional means, as heretofore described, for the isolation of the contained 2-diethylaminoethyl derivatives of methyl diphenylacetohydroxamate.

The hydrochloric acid salt of the derivative may be prepared by adding anhydrous hydrogen chloride to an ether solution of the product, or the quaternary salts may be prepared by dissolving the free base in ether and passing methyl bromide gas into the solution.

EXAMPLE III

To an alkylation flask is added 1 mole of methyl dicyclohexylacetohydroxamate, 2.5 moles of sodium carbonate and 1,500 g. of dimethyl acetamide. Following this, 1.5 moles of 2-chloro-N,N-diethylethylamine hydrochloride is slowly added portionwise during a period of about 0.5 hours while maintaining the temperature of the reaction at approximately 25°C. Upon completion of the addition of the tertiary aminoalkyl halide acid salt, the solution is heated to a temperature of about 100°C. over a period of 0.5 hours and maintained at this temperature for an additional period of 1.5 hours. At the end of this time a major portion of the dipolar aprotic solvent is removed by fractional distillation under reduced pressure. The residual slurry is then treated with water and methyl isobutylcarbinol and heated to a temperature of about 75°C. The two layers which result are separated and the top organic layer is treated by conventional means for isolation of the contained 2-diethylaminoethyl derivatives of methyl dicyclohexylacetohydroxamate.

In like manner a free base may, if so desired, be treated with an acid such as oxalic acid dissolved in isopropyl alcohol to form the oxalic salt of the derivative or may be treated with methyl bromide to form the quaternary salt thereof.

EXAMPLE IV

To a mixture comprising 1 mole of ethyl cyclopentylphenylacetohydroxamate and 1,500 g. of dimethyl formamide which also contains 2.5 moles of potassium carbonate is slowly added during a period of about 0.5 hours 1.5 moles of 2-chloro-N,N-dimethylethylamine hydrochloride, the reaction mixture being maintained at a temperature of about 25°C.–30°C. during the addition. Upon completion of the addition the temperature of the reaction mixture is raised to about 100°C. and maintained thereat for an additional period of 1.5 hours. At the end of this period a major portion of the dipolar aprotic solvent is removed by distillation under reduced pressure and thereafter the residual slurry is treated with water and an inert solvent. After separation of the mixture into two layers the organic layer is recovered and treated in a manner similar to the process set forth in the above examples to isolate the desired products comprising the 2-dimethylaminoethyl derivatives of ethyl cyclopentylphenylacetohydroxamate.

EXAMPLE V

In this example 34.8 g. methyl α-hydroxydiphenylacetohydroxamate were charged into a 500 cc. reaction flask along with 41.5 g. potassium carbonate, anhydrous powder, and 150 cc. dimethyl formamide. To this mixture 25.0 g. 1-chloro-2-pyrrolidinoethane hydrochloride were then added and the temperature raised to about 95°–100°C. and maintained for about 2 hours. The dimethyl formamide was then recovered by distillation in vacuo at about 50 mm. of pressure until about 110 g. had been collected and the residual material in the flask treated with 150 g. water and 200 cc. methyl isobutyl carbinol. On heating to about 70°C. the top organic liquid layer was then separated from the aqueous layer, washed with water, and cooled whereupon crystallization occurred. The product, comprising the oxygen alkylated 2-pyrrolidinoethyl derivative of methyl α-hydroxydiphenylacetohydroxamate, was filtered, washed with cooled isopropanol and dried, yielding 19.8 g. crystals melting at 100°–102°C. Recrystallization from 37 g. isopropanol afforded 17.5 g. colorless prisms melting at 101°–2°C.

EXAMPLE VI 51.4 g. methyl α-hydroxydiphenylacetohydroxamate were charged into a 500 cc. reaction vessel along with 200 cc. dimethyl formamide and 69.0 g. anhydrous, powdered potassium carbonate. To this mixture was added 40.5 g. 1-chloro-2-piperidinoethane hydrochloride plus an additional 50 cc. of dimethyl formamide and the temperature then raised to about 100°C. and maintained for about 2.5 hours. The dimethyl formamide was then removed by distillation in vacuo at about 50 mm. pressure until about 175 g. had been collected and to the residual material in the flask were added 250 cc. methyl isobutyl carbinol plus 250 cc. of water. The organic layer was separated from the aqueous layer at about 70°C. and cooled to about 5°C., whereupon crystallization took place. The crystals were filtered, washed with cold isopropanol and dried, yielding 42.9 g. colorless prisms having a melting point of 122°–4°C. This product comprised the oxygen alkylated 2-piperidinoethyl derivative of methyl α-hydroxydiphenylacetohydroxamate.

EXAMPLE VII

To a 500 cc. round bottom flask were charged 51.4 g. methyl α-hydroxydiphenylacetohydroxamate, 250 cc. dimethyl formamide, and 69.0 g. anhydrous, powdered potassium carbonate. To this mixture 41.0 g. 1-chloro-2-morpholinoethane hydrochloride were then added and the temperature raised to about 95°–100°C. and maintained for about 2 hours. The pressure was then reduced to about 50 mm. and the dimethyl formamide distilled out until about 175 g. had been collected, after which the residual material in the flask was treated with 250 cc. water and 250 cc. methyl isobutyl carbinol. The top organic layer was separated from the aqueous layer at about 70°C. and then cooled to about 15°C. The crystalline solid which separated was filtered, washed with cold isopropanol and dried to yield 57.1 g. colorless prisms having a melting point of 95.7°C. This product comprised the oxygen alkylated 2-morpholinoethyl derivative of methyl α-hydroxydiphenylacetohydroxamate.

We claim as our invention:

1. A process for the preparation of a mixture of tertiary aminoalkyl derivatives of a substituted aceto-hydroxamic acid ester said derivatives being represented by the following formulas:

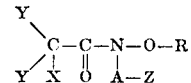

and

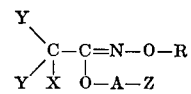

in which Y is phenyl, substituted phenyl, cyclopentyl or cyclohexyl, X is hydrogen or hydroxy, R is alkyl of one to five carbon atoms, A is alkylene of two to five carbon atoms, and Z is di- (lower alkyl) amino, piperidino, pyrrolidino or morpholino, which process comprises reacting a lower alkyl ester of a substituted acetohydroxamic acid with a halogen acid salt of a tertiary amino alkyl halide in a dipolar aprotic solvent medium in the presence of an acid acceptor compound.

2. The process as set forth in claim 1 in which said reaction conditions include a temperature in the range of from ambient to 150°C.

3. The process as set forth in claim 1 in which said dipolar aprotic solvent is dimethyl formamide.

4. The process as set forth in claim 1 in which said dipolar aprotic solvent is dimethyl acetamide.

5. The process as set forth in claim 1 in which said acid acceptor compound is potassium carbonate.

6. The process as set forth in claim 1 in which said acid acceptor compound is sodium carbonate.

7. The process as set forth in claim 1 in which said ester of a substituted acetohydroxamic acid is methyl α-hydroxydiphenylacetohydroxamate, and said acid salt of a tertiary aminoalkyl halide is 2-chloro-N,N-diethylethylamine hydrochloride.

8. The process as set forth in claim 1 in which said ester of a substituted acetohydroxamic acid is methyl dicyclohexylacetohydroxamate, and said acid salt of a tertiary aminoalkyl halide is 2-chloro-N,N-diethylethylamine hydrochloride.

9. The process as set forth in claim 1 in which said ester of a substituted acetohydroxamic acid is ethyl cyclopentylphenylacetohydroxamate, and said acid salt of a tertiary aminoalkyl halide is 2-chloro-N,N-dimethylethylamine hydrochloride.

10. The process as set forth in claim 1 in which said ester of a substituted acetohydroxamic acid is methyl α-hydroxydiphenylacetohydroxamate, and said acid salt of a tertiary aminoalkyl halide is 1-chloro-2-piperidino-ethane hydrochloride.

11. The process as set forth in claim 1 in which said ester of a substituted acetohydroxamic acid is methyl α-hydroxydiphenylacetohydroxamate, and said acid salt of a tertiary aminoalkyl halide is 1-chloro-2-pyrrolidinoethane hydrochloride.

12. The process as set forth in claim 1 in which said ester of a substituted acetohydroxamic acid is methyl α-hydroxydiphenylacetohydroxamate, and said acid salt of a tertiary aminoalkylhalide is 1-chloro-2-morpholinoethane hydrochloride.

* * * * *